(12) United States Patent
Jacobs et al.

(10) Patent No.: US 8,455,081 B2
(45) Date of Patent: Jun. 4, 2013

(54) BALLISTIC-RESISTANT ARTICLE

(75) Inventors: Martinus Johannas Nicolaas Jacobs, Heerlen (NL); Martin Antonius Van Es, Brunssum (NL)

(73) Assignee: DSM IP Assets B.V., Heerlen (NL)

( * ) Notice: Subject to any disclaimer, the term of this patent is extended or adjusted under 35 U.S.C. 154(b) by 581 days.

(21) Appl. No.: 11/917,902

(22) PCT Filed: Jun. 29, 2006

(86) PCT No.: PCT/EP2006/006301
§ 371 (c)(1),
(2), (4) Date: May 1, 2008

(87) PCT Pub. No.: WO2007/003334
PCT Pub. Date: Jan. 11, 2007

(65) Prior Publication Data
US 2008/0206525 A1    Aug. 28, 2008

(30) Foreign Application Priority Data

Jun. 30, 2005 (EP) .................................. 05076502

(51) Int. Cl.
*B32B 5/12* (2006.01)
*B32B 5/26* (2006.01)
*B32B 37/12* (2006.01)
*B32B 38/00* (2006.01)

(52) U.S. Cl.
USPC ........ 428/105; 139/383 R; 428/107; 428/156; 428/213; 428/364; 429/144

(58) Field of Classification Search
USPC .......... 428/105, 156, 107, 213, 364; 139/383, 139/383 R; 429/144
See application file for complete search history.

(56) References Cited

U.S. PATENT DOCUMENTS

| | | |
|---|---|---|
| 2004/0086685 A1 | 5/2004 | Brillhart, III et al. |
| 2004/0166755 A1 | 8/2004 | Bergmans et al. |

FOREIGN PATENT DOCUMENTS

| | | |
|---|---|---|
| EP | 0191306 B1 | 8/1986 |
| EP | 0 301 624 | 2/1989 |
| EP | 0683374 B1 | 7/1991 |
| EP | 0269151 | 8/1991 |
| EP | 0504954 A1 | 9/1992 |
| EP | 0907504 A1 | 7/2000 |
| EP | 1170925 A1 | 1/2002 |
| EP | 1 178 925 | 2/2002 |
| EP | 1144740 B1 | 10/2003 |
| GB | 2042414 A | 9/1980 |
| GB | 2164897 | 4/1986 |
| WO | 91/12136 A1 | 8/1991 |
| WO | 95/00318 | 1/1995 |
| WO | 97/49546 | 12/1997 |
| WO | WO 97/49546 | 12/1997 |
| WO | WO 01/67028 | 9/2001 |
| WO | 01/73173 | 10/2001 |
| WO | WO 02/101319 | 12/2002 |
| WO | 2005/066577 A1 | 7/2005 |

OTHER PUBLICATIONS

International Search Report for PCT/EP2006/006301 mailed Nov. 8, 2006.
Written Opinion of the International Searching Authority for PCT/EP2006/006301.
Jane's Ammunition Handbook, 9$^{th}$ Ed., Jane's Information Group Ltd., pp. 19-20 (2000).
Jane's Ammunition Handbook, ISBN 0 7106 2012 8, 9$^{th}$ Ed., 2000-2001, pp. 19-20.
STANAG 2920, NATO Standardization Agency (NSA), "Ballistic Test Method for Personal Armour Materials and Combat Clothing", Jul. 31, 2003.

*Primary Examiner* — Brent O'Hern
(74) *Attorney, Agent, or Firm* — Nixon & Vanderhye P.C.

(57) ABSTRACT

The invention relates to a preformed sheet comprising at least two mono-layers, each mono-layer containing a fibrous network with fibers having a tensile strength of at least about 1.2 GPa and a tensile modulus of at least 40 GPa and a binder, and a separating film on at least one of its outer surfaces, characterized in that the separating film has an areal density of between 1 and 5 g/m$^2$. With this preformed sheet assemblies and articles offering a substantially higher ballistic protection level at a certain weight can be obtained. The invention further relates to an assembly of at least two such sheets and to a flexible ballistic-resistant article comprising said assembly.

14 Claims, No Drawings

BALLISTIC-RESISTANT ARTICLE

This application is the U.S. national phase of International Application No. PCT/EP2006/006301, filed 29 Jun. 2006, which designated the U.S. and claims priority to European Application No. 05076502.3, filed 30 Jun. 2005, the entire contents of each of which are hereby incorporated by reference.

The invention relates to a preformed sheet, to an assembly of at least two sheets and to a flexible ballistic-resistant article comprising said assembly. A preformed sheet comprises at least two mono-layers, each mono-layer containing a fibrous network with fibres having a tensile strength of at least about 1.2 GPa and a tensile modulus of at least 40 GPa and preferably a binder, and a separating film on at least on one of its outer surfaces.

In a preferred embodiment, the invention relates to a preformed sheet, to an assembly of at least two sheets and to a flexible ballistic-resistant article comprising said assembly, whereby the preformed sheet in this embodiment comprises at least two mono-layers, each mono-layer containing unidirectionally oriented fibres having a tensile strength of at least about 1.2 GPa and a tensile modulus of at least 40 GPa and a binder, with a fibre direction in each mono-layer being rotated with respect to the fibre direction in an adjacent mono-layer, and a separating film on at least on one of its outer surfaces.

A preformed sheet is known from EP 0907504 A1. This reference describes a composite layer (or preformed sheet), which was produced by cross-wise stacking of 4 monolayers to obtain a stack and applying a separating film made from a linear low-density polyethylene, and subsequently consolidating the stack at elevated temperature under pressure. The mono-layers containing unidirectionally oriented fibres were produced by aramid yarn fibres having a titer of 1680 dtex being guided from a bobbin frame over a comb and wetting them with an aqueous dispersion of a polystyrene-polyisoprene-polystyrene blockcopolymer as a binder or matrix material. Flexible ballistic-resistant shaped articles were made from a non-linked stack of several of said composite layers, the stack being stabilized by stitching at the corners.

A drawback of the preformed sheet known from the prior art is that the ratio between energy absorption of a ballistic-resistant article comprising said sheets, which is a measure for the ballistic protection level, and the weight of the ballistic resistant article is unfavourable. This ratio is generally expressed as the specific energy absorption (SEA) that is the energy absorbed per areal mass (generally called areal density (AD)). This implies that a relatively heavy ballistic-resistant article is required to achieve a certain desired protection level. If the ballistic-resistant article, on the other hand, has a low weight, the article provides a relatively low protection level against ballistic hits. For a large number of applications the lowest possible weight of the ballistic resistant-article in conjunction with a certain minimum protection level is of great importance. This is the case, for example, in the field of personal protection, such as clothing and body armour, like for example bullet-proof vests; but also for application in, for example, vehicles.

There is thus a constant need in industry for a preformed sheet that enables making of ballistic-resistant articles offering a higher protection level at a certain weight of the article, or alternatively for a preformed sheet that enables making of ballistic-resistant articles with a lower weight at a certain protection level of the article.

According to the present invention, this is provided by a preformed sheet wherein the separating film has an areal density of between 1 and 5 g/m$^2$ whereby the separating film is preferably a free standing film. A free standing film in this application means a film that can be handled without the use of supporting means such as e.g. a supporting layer.

With the preformed sheet according to the invention, a substantially higher protection level at a certain weight of an assembly of sheets or a ballistic-resistant article comprising an assembly of sheets according to the invention can be obtained. A further advantage is that, the preformed sheets according to the invention can be better checked by the human eye, e.g. during quality control in a production process. This is due to the higher transparency of the separating sheets used in the present invention as compared to separating sheets as used in e.g. EP 0907504 A1.

With ballistic-resistant articles are meant shaped parts, comprising an assembly of at least two preformed sheets according to the invention, which can be used as, for example, protective clothing or for armouring of vehicles, and which offer protection against ballistic impacts such as by bullets and ballistic fragments.

An assembly according to the invention contains a stack of preformed sheets that are preferably substantially not linked to one another; that is, the sheets are not attached or adhered to each other over a substantial part of their adjacent surfaces. More preferably an assembly according to the invention contains a stack of preformed sheets that are not linked to one another. It is, however, difficult to handle a stack of preformed sheets that are not linked to one another, because such stack lacks any coherence required for further processing. To achieve some level of coherence, the ballistic-resistant article may, for example, be stitched through. Such stitching is done as little as possible, for example only at the corners or around the edges, in order to allow some movement of sheets relative to each other. Another possibility is to enclose the stack of preformed sheets in a flexible cover or envelop. Thus the preformed sheets in the assembly or in the ballistic resistant article remain able to shift with respect to one another, whereas the assembly or article in itself does have coherence and shows good flexibility.

A fibrous network in this application comprises fibres arranged in a network of various configurations. For example, fibres can be made into various different alignments from twisted or untwisted yarn bundles. Suitable examples include a knitted or woven (plain, twill, basket, satin or other weave) fabric, or non-woven structures like a felt or a layer of unidirectionally oriented fibres. In view of ballistic performance, network configurations wherein the high-strength fibres are mainly oriented in one direction are preferred. Examples hereof not only include layers of unidirectionally oriented fibres, but also woven structures wherein the high-strength fibres form a major part of the woven; e.g. as the warp fibres, and wherein the weft fibres form a minor part and need not be high-strength fibres; like the constructions described in EP 1144740 B1 or other wovens referred to as uniweave fabrics. Most preferably the fibrous network contains unidirectionally oriented fibres having a tensile strength of at least about 1.2 GPa and a tensile modulus of at least 40 GPa. This gives preformed sheets having the best ballistic performance.

A preformed sheet comprises at least two mono-layers of preferably unidirectionally oriented fibres, with a fibre direction in each mono-layer being rotated with respect to the fibre direction in an adjacent mono-layer, and the at least two mono-layers being linked or attached to one another. The angle of rotation, which means the smallest angle enclosed by the fibres of the adjacent mono-layers, is between 0°, and 90°. Preferably, the angle is between 45° and 90°. Most preferably, the angle is between 80° and 90°. Ballistic-resistant articles in which the fibres in the adjacent mono-layers are at such an angle to one another have better antiballistic characteristics. The term mono-layer refers to a layer containing a fibrous network.

In a special embodiment, the term mono-layer refers to a layer of unidirectionally oriented fibres and a binder that basically holds the unidirectionally oriented fibres together.

The term fibre comprises not only a monofilament but, inter alia, also a multifilament yarn or flat tapes. The term unidirectionally oriented fibres refers to fibres that, in one plane, are essentially oriented in parallel. Width of the flat tape preferably is between 2 mm and 100 mm, more preferably between 5 mm and 60 mm, most preferably between 10 mm and 40 mm. Thickness of the flat tape preferably is between 10 μm and 200 μm, more preferably between 25 μm and 100 μm. The flat tape may be composed of a single member of one material, but may also comprise unidirectionally oriented fibres and a binder.

The fibres in the preformed sheet of the invention have a tensile strength of at least about 1.2 GPa and a tensile modulus of at least 40 GPa. The fibres may be inorganic or organic fibres. Suitable inorganic fibres are, for example, glass fibres, carbon fibres and ceramic fibres.

Suitable organic fibres with such a high tensile strength are, for example, aromatic polyamide fibres (also often referred to as aramid fibres), especially poly(p-phenylene teraphthalamide), liquid crystalline polymer and ladder-like polymer fibres such as polybenzimidazoles or polybenzoxazoles, esp. poly(1,4-phenylene-2,6-benzobisoxazole) (PBO), or poly(2, 6-diimidazo[4,5-b-4',5'-e]pyridinylene-1,4-(2,5-dihydroxy) phenylene) (PIPD; also referred to as M5) and fibres of, for example, polyolefins, polyvinyl alcohol, and polyacrylonitrile which are highly oriented, such as obtained, for example, by a gel spinning process. The fibres preferably have a tensile strength of at least about 2 GPa, at least 2.5 or even at least 3 GPa. Highly oriented polyolefin, aramid, PBO and PIPD fibres, or a combination of at least two thereof are preferably used. The advantage of these fibres is that they have very high tensile strength, so that they are in particular very suitable for use in lightweight ballistic-resistant articles.

Suitable polyolefins are in particular homopolymers and copolymers of ethylene and propylene, which may also contain small quantities of one or more other polymers, in particular other alkene-1-polymers.

Good results are obtained if linear polyethylene (PE) is selected as the polyolefin. Linear polyethylene is herein understood to mean polyethylene with less than 1 side chain per 100 C atoms, and preferably with less than 1 side chain per 300 C atoms; a side chain or branch generally containing at least 10 C atoms. The linear polyethylene may further contain up to 5 mol % of one or more other alkenes that are copolymerisable therewith, such as propene, butene, pentene, 4-methylpentene, octene. Preferably, the linear polyethylene is of high molar mass with an intrinsic viscosity (IV, as determined on solutions in decalin at 135° C.) of at least 4 dl/g; more preferably of at least 8 dl/g. Such polyethylene is also referred to as ultra-high molar mass polyethylene (UHPE). Intrinsic viscosity is a measure for molar mass (also called molecular weight) that can more easily be determined than actual molar mass parameters like $M_n$ and $M_w$. There are several empirical relations between IV and $M_w$, but such relation is highly dependent on molar mass distribution. Based on the equation $M_w=5.37\times10^4 [IV]^{1.37}$ (see EP 0504954 A1) an IV of 4 or 8 dl/g would be equivalent to $M_w$ of about 360 or 930 kg/mol, respectively.

High performance polyethylene (HPPE) fibres consisting of polyethylene filaments that have been prepared by a gel spinning process, such as described, for example, in GB 2042414 A or WO 01/73173, are preferably used. A gel spinning process essentially consists of preparing a solution of a linear polyethylene with a high intrinsic viscosity, spinning the solution into filaments at a temperature above the dissolving temperature, cooling down the filaments to below the gelling temperature, such that gelling occurs, and stretching the filaments before, during or after the removal of the solvent.

The term binder refers to a material that binds or holds the fibres together and may enclose the fibres in their entirety or in part, such that the structure of the mono-layer is retained during handling and making of preformed sheets. The binder material can have been applied in various forms and ways; for example as a film, as a transverse bonding strip or as transverse fibres (transverse with respect to the unidirectional fibres), or by impregnating and/or embedding the fibres with a matrix material, e.g. with a polymer melt, a solution or a dispersion of a polymeric material in a liquid. Preferably, matrix material is homogeneously distributed over the entire surface of the mono-layer, whereas a bonding strip or bonding fibres can be applied locally. Suitable binders are described in e.g. EP 0191306 B1, EP 1170925 A1, EP 0683374 B1 and EP 1144740 A1.

In a preferred embodiment, the binder is a polymeric matrix material, and may be a thermosetting material or a thermoplastic material, or mixtures of the two. The elongation at break of the matrix material is preferably greater than the elongation of the fibres. The binder preferably has an elongation of 3 to 500%. Suitable thermosetting and thermoplastic matrix materials are enumerated in, for example, WO 91/12136 A1 (pages 15-21). From the group of thermosetting polymers, vinyl esters, unsaturated polyesters, epoxies or phenol resins are preferably selected as matrix material. From the group of thermoplastic polymers, polyurethanes, polyvinyls, polyacrylics, polyolefins or thermoplastic elastomeric block copolymers such as polyisoprene-polyethylene-butylene-polystyrene or polystyrene-polyisoprene-polystyrene block copolymers can be selected as matrix material. Preferably the binder consists essentially of a thermoplastic elastomer, which preferably substantially coats the individual filaments of said fibres in a monolayer, and has a tensile modulus (determined in accordance with ASTM D638, at 25° C.) of less than about 40 MPa. Such a binder results in high flexibility of a mono-layer, and of an assembly of preformed sheets. It was found that very good results are obtained if the binder in the mono-layers and preformed sheet is a styrene-isoprene-styrene block copolymer.

In a special embodiment of the invention, the binder in the preformed sheet according to the invention also contains, in addition to the polymeric matrix material, a filler in an amount of from 5 to 80% by volume, calculated on the basis of the total volume of the binder. More preferably, the amount of filler is from 10 to 80% by volume and most preferably from 20 to 80% by volume. It was found that as a result, the flexibility of the ballistic resistant article increases without significant adverse effects on the antiballistic characteristics.

The said fillers do not contribute to the bonding between the fibres, but rather serve for volumetric dilution of the matrix between the fibres, as a result of which the ballistic resistant article is more flexible and has higher energy absorption. The filler preferably comprises a finely dispersed substance having a low weight or density. The filler may be a gas, although using a gas as filler may present practical problems in processing the matrix material. The filler may also, inter alia, comprise the substances customary for preparing dispersions, such as emulsifiers, stabilizers, binders and the like or a finely dispersed powder.

It was found that if the binder contains an amount of filler below 80% by volume, the amount of binder is sufficient to achieve adequate bonding between the fibres, with a constant total quantity of matrix material. It was also found that if the matrix contains a quantity of filler greater than 5% by volume, the flexibility of the ballistic resistant article increases.

Preferably, the amount of binder in the mono-layer is at most 30 mass %, more preferably at most 25, 20, or even at most 15 mass %. This results in the best ballistic performance.

The preformed sheet of the invention comprises a separating film with an areal density of between 1 and 5 g/m² on at least one of its outer surfaces. Said film may be for example a polyolefin such as e.g. polyethylene or polypropylene, a polyester, a polyamide, a polycarbonate or a polystyrene film. These films are dense films substantial free of voids or porosity. Preferably the preformed sheet of the invention comprises said separating film on both of its outer surfaces. The separating film is a preferably made from a polyolefin—more preferably a polyethylene or a polypropylene—a polyester—especially a thermoplastic polyester or a polycarbonate. In a preferred embodiment, the separating film is essentially made from a high molar mass polyethylene, more preferably form an ultra-high molar mass polyethylene (UHPE) of IV at least 4 dl/g. Such a film may be produced according to a process as disclosed in GB2164897. Such films show generally relatively high strength and modulus, and high abrasion resistance.

The preformed sheet may further comprise an adhesive or adhesive layer between the separating film and other layers, in order to improve inter-layer adhesion, and thus consistency and stability of the preformed sheet. Various types of commercially available adhesives or adhesive layers may be used. Their choice depends of the required consistency and stability of the preformed sheet and can be chosen by the skilled man by routine experiments. A higher consistency and stability of the sheet can be obtained if during lamination a higher pressure or temperature is applied.

In a special embodiment of the invention, the preformed sheet contains mono-layers comprising HPPE fibres and a polyethylene separating film. The advantage of such construction is that an even higher ballistic performance is obtained.

Preferably the separating film is a biaxially-stretched film, more preferably an at least 4× biaxially-stretched film, most preferably a 10 to 100× biaxially-stretched film. A 10 to 100× biaxially-stretched film is herein understood to be a film, which is stretched in two perpendicular directions such that the surface of the film increased by a factor 10 to 100. An advantage of biaxially-stretched films is that an even higher protection level at a certain weight can be obtained.

Stretch ratios in said two perpendicular directions, generally referred to as machine and transverse direction, may be equal, however other ratios may also be chosen. Preferably the stretch ratio in machine to transverse direction varies from 1:1 to 1:3, more preferably from 1:1 to 1:2, more preferably from 1:1 to 1:1.5.

Preferably, the film is at least 20× biaxially stretched, at least 30×, or even at least 40×. More preferably, biaxially-stretched films made from polyethylene, especially UHPE, polypropylene, thermoplastic polyester or polycarbonate are applied in the sheets. Most preferably, biaxially-stretched films made from polyethylene, polypropylene, polyethylene terephthalate or polycarbonate. These films are commercially available from several suppliers, such as e.g. Treofan. Such films have relatively high tensile strength and modulus, which may contribute to lower deformation of the preformed sheet upon impact. Tensile properties are preferably expressed per width of film (e.g. in N/m) and not per cross-section (like N/m²). Preferably, therefore, the separating film has a tensile strength per width of film (herein also called strength factor) of at least 150 N/m, at least 200, or even at least 250 N/m. In case of films with high elongation at break (for example greater than 20%) the yield strength is preferably taken as reference rather than strength at break. Tensile modulus per width of film is preferably at least 3000 N/m, at least 4000, or even at least 5000 N/m.

The best results were obtained with a preformed sheet wherein the separating film has an areal density of between 2 and 4 g/m².

Preferably the preformed sheet according to the invention comprises at least two mono-layers containing unidirectionally oriented fibres. In general, the preformed sheet comprises 2, 4 or another multiple of 2 perpendicularly oriented mono-layers. Preferably, the preformed sheet comprises two mono-layers of unidirectionally oriented fibres combined with a biaxially-stretched film having an areal density of between 1 and 5 g/m². A preformed sheet with 2 or 4 mono-layers of unidirectionally oriented fibres combined with biaxially-stretched films on both outer surfaces turned out to give the best ballistic protection.

In a special embodiment of the invention, the preformed sheet contains as a separating film a uniaxially stretched film, preferably films with a stretch ratio of at least 4, more preferably films with a stretch ratio of between 10 and 50. Such an uniaxially stretched film is preferably placed such that the stretch direction of the film is perpendicular to the fibre direction in the adjacent layer of unidirectional fibres. In such case, the sheet may contain an uneven number of mono-layers. In a special embodiment, 3 mono-layers of unidirectional oriented fibres, a center layer of which can have up to about the same areal density as both adjacent mono-layers together, have been covered on both outer surfaces with uniaxially stretched films, with stretch direction perpendicular to the fibre direction in the adjacent layer of unidirectional fibres. The advantage of such construction is, that in a continuous process of making a sheet via e.g. calandering uniaxially stretched films onto a stack of monolayers, both separating films can be applied in the same direction from rolls of sheet.

The invention further relates to an assembly of at least two preformed sheets according to the invention. Preferably the sheets are substantially not linked to one another. With increasing number of preformed sheets, the ballistic protection level is improved, but the weight of the assembly increases, and the flexibility decreases. In order to obtain a maximum flexibility, adjacent sheets in an assembly are not linked to one another. However, to achieve some level of coherence the assembly of preformed sheets may, for example, be stitched through. Depending on the ballistic threat and the level of protection desired, the skilled person can find an optimum in the number of sheets by some experimentation.

Further advantages of the ballistic-resistant assembly according to the invention, or article comprising such assembly, are found in applications in which, in addition to the weight and the protection level of the ballistic-resistant article, the flexibility plays an important part.

It was found that a suitable flexibility, protection level and weight of the ballistic-resistant assembly is achieved if the weight of the preformed sheets has a particular maximum value. Preferably, the weight, or areal density of the preformed sheet in the ballistic-resistant articles in a permanently flexible application is at most 500 g/m², the fibre content of each mono-layer being between 10 and 150 g/m². More preferably, the weight of the preformed sheet is at most 300 g/m², the fibre content of each mono-layer being between 10 and 100 g/m².

The ballistic-resistant assembly can, in principle, be fabricated by any known suitable method, for example in accordance with processes described in WO 95/00318, U.S. Pat. No. 4,623,574, or U.S. Pat. No. 5,175,040. A mono-layer is produced, for example, by fibres, preferably in the form of continuous multifilament yarns, being guided from a bobbin frame across a comb, as a result of which they are oriented in parallel in a plane. A number of mono-layers is laid with an angle of rotation, preferably at an angle of about 90°, on top of one another, and a separating film is placed on at least one of both surfaces (on top of and/or below the stacked mono-layers), a preformed sheet being formed in the process. Preferably the preformed sheet is consolidated using known techniques; this may for example be done discontinuously by compressing a stack in a mould, or continuously via laminating and/or calandering steps. During consolidation, such conditions as temperature, pressure and time are chosen, that all layers at least partly adhere to each other, preferably without melting the separating film. Higher adherence can be obtained by varying temperature pressure and/or time whereby detailed conditions can be established through routine experiments by a skilled man.

If a matrix material is applied as binder, the matrix material may thus be made to flow between the fibres and to adhere to the fibres of the under- and/or overlying mono-layers, and optionally to the separating film. If a solution or a dispersion of the matrix material is employed, the process of forming the mono-layers into a multi-layer sheet also comprises a step of evaporating the solvent or dispersant, generally before the steps of placing separating film layers and consolidation. Then the preformed sheets are stacked to produce an assembly, which in turn can be applied to make a ballistic-resistant article, with the option of stabilizing the assembly by for example local stitching or enveloping the stack with a flexible cover.

It was found that, with a view to obtaining a low binder content, especially a low matrix material content, it is advantageous to use a method in which the mono-layer is produced by wetting yarns having a count of yarn (or titer) of between 200 and 5000 dtex with a dispersion of the matrix material and the optional filler. Yarns having a count of yarn less than 200 dtex absorb comparatively little matrix material from the dispersion. Preferably, the count is greater than 500 dtex, more preferably greater than 800 dtex, even more preferably greater than 1000 dtex and most preferably greater than 1200 dtex. The count of yarn is preferably lower than 5000 dtex, more preferably lower than 2500 dtex because these yarns can be spread more readily in the plane of the mono-layer.

Preferably, an aqueous dispersion of a matrix material is used. An aqueous dispersion has a low viscosity, which has the advantage that the matrix material is very uniformly distributed over the fibres, and good, homogeneous fibre-fibre bonding being achieved as a result. A further advantage is that the dispersant water is non-toxic and can therefore be evaporated in the open air. Preferably, the dispersion, likewise with a view to obtaining a uniform distribution at the low matrix percentage aimed for, contains between 30 and 60 mass % of solid components, i.e. elastomeric matrix material and the optional filler, relative to the total mass of the dispersion.

The ballistic-resistant assembly according to the invention, obtainable according to the methods described above, shows very good ballistic properties as expressed by $V_{50}$ and SEA values, especially at relatively low areal density. Preferably, the assembly according to the invention, or a flexible ballistic-resistant article comprising such assembly, has a specific energy absorption (SEA) of at least 300 Jm²/kg, when struck by a bullet of type FMJ Parabellum 9×19 mm (8 grams). The energy absorption (EA) upon impact of a bullet or a ballistic fragment is calculated from the kinetic energy of a bullet or ballistic fragment of velocity $V_{50}$. The $V_{50}$ is the velocity at which the probability of the bullets or ballistic fragments penetrating through the ballistic structure is 50%.

The invention more specifically relates to a flexible ballistic-resistant article comprising an assembly of a plurality of sheets containing at least two mono-layers consisting essentially of HPPE multifilament yarn having a tensile strength of at least about 1.2 GPa and at least one polyethylene separating film having an areal density of between 1 and 5 g/m², the assembly having an areal density (AD) of at least 2.4 kg/m² and a specific energy absorption (SEA) of at least 280 J·m²/kg as measured against a 9×19 mm FMJ Parabellum bullet according to a test procedure based on Stanag 2920. Preferably, the article has a SEA of at least 300, 325, 350, or even at least 375 J·m²/kg.

A preferred embodiment relates to a flexible ballistic-resistant article comprising an assembly, which contains a plurality of preformed sheets containing at least two mono-layers, each mono-layer comprising unidirectionally oriented high-performance fibres having a tensile strength of at least 1.2 GPa, with the fibre direction in each mono-layer being rotated with respect to the fibre direction in an adjacent mono-layer, and at least one separating film, which film preferably has an areal density of between 1 and 5 g/m², on one of the outer surfaces of the preformed sheet, the assembly having an areal density of at least 2.4 kg/M² and a specific energy absorption of at least 300 J·m²/kg as measured against a 9×19 mm FMJ Parabellum bullet according to a test procedure based on Stanag 2920. Preferably the unidirectionally oriented high-performance fibres are high performance polyethylene fibres.

The invention is further explained by means of the following examples, without being limited thereto,
Test Methods as Referred to in the Present Application, are as Follows:
   IV: the Intrinsic Viscosity is determined according to method PTC-179 (Hercules Inc. Rev. Apr. 29, 1982) at 135° C. in decalin, the dissolution time being 16 hours, with DBPC as anti-oxidant in an amount of 2 g/l solution, by extrapolating the viscosity as measured at different concentrations to zero concentration;
   Side chains: the number of side chains in a UHPE sample is determined by FTIR on a 2 mm thick compression moulded film, by quantifying the absorption at 1375 cm$^{-1}$ using a calibration curve based on NMR measurements (as e.g. in EP 0269151);
   Tensile properties (measured at 25° C.): tensile strength (or strength), tensile modulus (or modulus) and elongation at break (or eab) are defined and determined on multifilament yarns as specified in ASTM D885M, using a nominal gauge length of the fibre of 500 mm, a crosshead speed of 50%/min. On the basis of the measured stress-strain curve the modulus is determined as the gradient between 0.3 and 1% strain. For calculation of the modulus and strength, the tensile forces measured are divided by the titre, as determined by weighing 10 metres of fibre; values in GPa are calculated assuming a density of 0.97 g/cm³. Tensile properties of thin films were measured in accordance with ISO 1184(H).

Ballistic performance: $V_{50}$ and SEA of composite panels were determined with a test procedure according to Stanag 2920, using 9 mm*19 mm FMJ Parabellum bullets (from Dynamit Nobel). An assembly of layers was fixed using flexible straps on a support filled with Roma Plastilin backing material, which was preconditioned at 35° C.

PREPARATION OF HPPE FIBRES, AS USED IN THE FOLLOWING EXAMPLE AND COMPARATIVE EXPERIMENTS

A HPPE multifilament yarn was made by extruding an 8 mass % solution of a UHPE homopolymer having less than 0.3 side groups per 1000 per carbon atoms and an IV of 19.8 dl/g in decalin containing a ratio of cis/trans isomers of between 38/62 and 42/58, and extruded with a 130 mm twin screw extruder equipped with a gear-pump at a temperature setting of 180° C. through a spinplate with a rate of 2.2 g/min per hole. The fluid filaments were cooled in a water bath and were taken-up at such a rate that a draw ratio of 16 was applied to the as-spun filaments. The filaments were subsequently further drawn in the solid state in two steps with a temperature gradient of about 110 to about 150° C., thereby applying a total solid state draw ratio of about 25. The yarns thus obtained had a titer of 930 dtex, a tensile strength of 4.1 GPa and a modulus of 150 GPa.

Comparative Experiment A

A mono-layer was produced from the HPPE fibres described above, by guiding several yarns from a bobbin frame over a comb and wetting the filaments with an aqueous dispersion of 25 wt % Kraton® D1107 (polystyrene-polyisoprene-polystyrene block copolymer thermoplastic elastomer) as matrix material. The yarns were oriented in parallel in a plane, and after drying the areal density of the mono-layer was about 20 g/m², matrix content was about 18 mass %. A preformed sheet was produced by crosswise stacking 4 monolayers and applying as separating layers on each side a Stamylex® linear low-density polyethylene film with a thickness of 7.6 micron (equivalent to an areal density of about 7 g/m²), and consolidating the mono-layers and the separating films at a pressure of about 0.5 MPa and at a temperature of about 110-115° C. The polyethylene film had a strength at yield of about 10 MPa, or a strength factor of about 70 N/m.

A flat ballistic-resistant article was made from a loose, non-linked assembly of a number of preformed sheets, the assembly being stitched through at the corners. Ballistic performance for three different assemblies was tested with a bullet type 9×19 mm FMJ Parabellum (8 g); $V_{50}$ and SEA results are given in Table 1.

Example 1

Comparative experiment A was repeated, but now a 3.50 micron polypropylene film Treofan PHD 3.5 (from Treofan Germany GmbH), was applied as separating film. This biaxially stretched film had a tensile strength of about 190 MPa, elongation at break of 90%, a strength factor of about 650 N/m and a modulus factor of 10500 N/m. The flexibility of the stabilized assembly was judged as higher; the stack could more easily be bended than the stack of Comparative Experiment A. Surprisingly, observed $V_{50}$ values, were markedly higher than for Comparative Experiment A. Due to the lower weight of the preformed sheet 2 additional preformed sheets (26 in total) could be used in the assembly in order to obtain the same weight as in Comparative Experiment A, i.e. 8% increase of number of preformed sheets. The ballistic performance, SEA, however increased from 260 to 312 J·m²/kg, i.e. an increase of 20%.

Comparative Experiment B and Example 2

Comparative experiment A and example 1, respectively, were repeated, but the monolayers had an AD of about 40 g/m² and the matrix content was about 18 mass %. A preformed sheet was produced by crosswise stacking 2 instead of 4 monolayers. Test results as given in Table 1 confirm the improved ballistic performance: 12% increase in SEA upon 8% increase of number of preformed sheets. Table 1

| | | Assembly of sheets | | | |
| | | | | Ballistic results | |
| Experiment | Performed sheet # of mono-layers | # of sheets | AD (kg/m²) | $V_{50}$ (m/s) | SEA (J·m²/kg) |
| --- | --- | --- | --- | --- | --- |
| Comp. Exp. A | 4 | 24 | 2.54 | 406 | 260 |
| Example 1 | 4 | 26 | 2.53 | 444 | 312 |
| Comp. Exp. B | 2 | 26 | 2.48 | 418 | 282 |
| Example 2 | 2 | 28 | 2.46 | 438 | 311 |

The invention claimed is:

1. A flexible preformed sheet comprising:
   at least two mono-layers, each mono-layer containing a fibrous network with fibres having a tensile strength of at least about 1.2 GPa and a tensile modulus of at least 40 GPa and a binder, and
   a separating film on at least one outer surface of the preformed sheet, wherein
   the separating film is substantially free of voids or porosity and has an area density of between 1 and 5 g/m², wherein
   the preformed sheet is sufficiently flexible for incorporation into clothing to be worn by a person in need of ballistic protection.

2. The preformed sheet according to claim 1, wherein each mono-layer has a fibre direction with the fibre direction in each mono-layer being rotated with respect to the fibre direction in an adjacent mono-layer.

3. The preformed sheet according to claim 1, with a separating film on both of its outer surfaces.

4. The preformed sheet according to claim 1, wherein the fibres are polyethylene fibres.

5. The preformed sheet according to claim 1, wherein the binder consists essentially of a thermoplastic elastomer and has an elongation of 3 to 500%.

6. The preformed sheet according to claim 1, wherein the separating film is made from polyethylene, polypropylene, polyester or polycarbonate.

7. The preformed sheet according to claim 1, wherein the separating film is a biaxially stretched film.

8. The preformed sheet according to claim 1, wherein the separating film has an area density of between 2 and 4 g/m².

9. The preformed sheet according to claim 1, wherein the separating film has a strength factor of at least 150 N/m.

10. The preformed sheet according to claim 1, comprising at least two mono-layers of unidirectionally oriented fibres.

11. An assembly comprised of at least two flexible preformed sheets which are not linked to one another, wherein each of the preformed sheets comprises:

at least two mono-layers, each mono-layer containing a fibrous network with fibres having a tensile strength of at least about 1.2 GPa and a tensile modulus of at least 40 GPa and a binder, and a separating film on at least on one outer surface of the at least two preformed sheets, wherein the separating film is substantially free of voids or porosity and has an area density of between 1 and 5 $g/m^2$, and wherein the at least two flexible preformed sheets are able to shift relative to one another, wherein each preformed sheet is sufficiently flexible for incorporation into clothing to be worn by a person in need of ballistic protection.

12. A flexible ballistic-resistant article comprised of at least two flexible preformed sheets, wherein each of the preformed sheets comprises:

at least two mono-layers, each mono-layer containing a fibrous network with fibres having a tensile strength of at least about 1.2 GPa and a tensile modulus of at least 40 GPa and a binder, and a separating film on at least on one outer surface of the at least two preformed sheets, wherein the separating film is substantially free of voids or porosity and has an area density of between 1 and 5 $g/m^2$, and wherein the at least two flexible preformed sheets are not linked to one another so as to be able to shift relative to one another, wherein each preformed sheet is sufficiently flexible for incorporation into clothing to be worn by a person in need of ballistic protection.

13. A flexible ballistic-resistant article comprising an assembly, which contains a plurality of preformed sheets containing at least two mono-layers, each monolayer comprising unidirectionally oriented fibres having a tensile strength of at least 1.2 GPa, with the fibre direction in each mono-layer being rotated with respect to the fibre direction in an adjacent monolayer, and at least one separating film on one of the outer surfaces of the preformed sheet, the assembly having an area density of at least 2.4 $kg/m^2$ and a specific energy absorption of at least 300 $J \cdot m^2/kg$ as measured against a 9×19 mm FMJ Parabellum bullet according to a test procedure based on Stanag 2920.

14. The flexible ballistic-resistant article according to claim 13, wherein the unidirectionally oriented fibres are polyethylene fibres.

* * * * *